United States Patent Office 3,303,188
Patented Feb. 7, 1967

3,303,188
PROCESS FOR PREPARING NEW 5-NITROFURYL COMPOUNDS
Akira Takai, Isamu Saikawa, Yutaka Kodama, Yasumasa Matsubara, and Shiro Hirai, all of Toyama, Japan, assignors to Toyama Kagaku Kogyo Kabushiki Kaisha, Tokyo, Japan
No Drawing. Filed Sept. 6, 1963, Ser. No. 307,021
Claims priority, application Japan, Sept. 11, 1962, 37/38,952
5 Claims. (Cl. 260—240)

This invention relates to new chemical compounds and a process for preparation thereof. More particularly, it relates to novel nitrofuran derivatives having the general formula

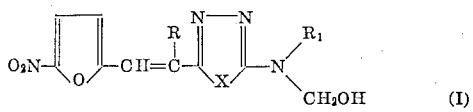

wherein R is a member selected from the group consisting of hydrogen, alkyl group and aryl group; $R_1$ is a member selected from the group consisting of alkyl group and hydroxymethyl group; and X is oxygen or sulfur and a process for preparation thereof.

It is an object of the present invention to provide the novel compounds possessing potent antibacterial activities being maintained in the body. It is another object of the invention to provide a process for preparing the novel nitrofuran compounds of the above-described Formula I, which show potent antibacterial activities, compared with the known nitrofuran compounds, and are useful as chemotherapeutics, antiseptics and the like. Heretofore, it has been successfully performed by us to introduce hydroxymethyl group into primary or secondary amine derivatives of nitrofuran compounds which contain 1,2,4-triazine ring and pyrimidine ring to find that the resulting products have prolonged duration of antibacterial activities in the body.

As a result of many investigations for obtaining new furan compounds which will not be inactivated in the body, we have now completed the present invention.

The 2 - amino - 1,3,4-oxadiazole and 2-amino-1,3,4-thiadiazole derivatives with 5-nitrofurylethenyl group introduced at 5-position have high antibacterial activities in the body and, moreover, it is expected that by introducing hydroxymethyl group into 2-amino group outstanding increase in the antibacterial activities will be resulted.

The process of the present invention comprises reacting nitrofuran derivatives having the general formula

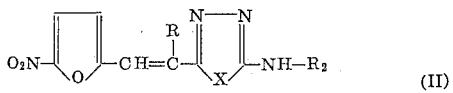

wherein R and X have the same meanings as above, and $R_2$ is a member selected from the group consisting of hydrogen and alkyl group with formaldehyde.

In carrying out the process according to the present invention, the reaction is generally effected by heating the reactants in the presence of an inert organic solvent, such as, alcohols, dioxane, dimethylformamide or ethylene glycol monoethylether. It is preferred to employ more than theoretical amount of formaldehyde in the form of aqueous solution.

The reaction of the present invention is illustrated by the following equations:

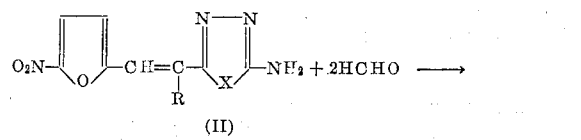

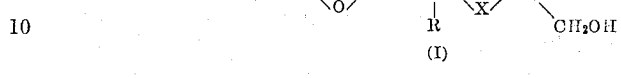

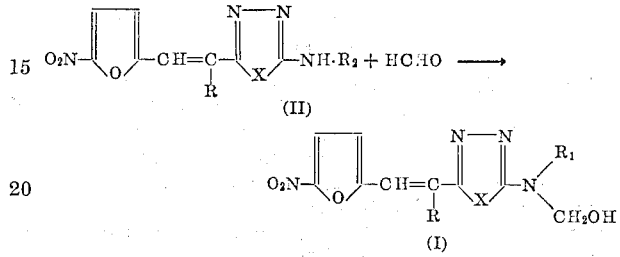

wherein R, $R_1$, $R_2$ and X have the same meanings as above.

The compounds of the above-described Formula I exhibit the high in vitro antibacterial activities against many pathogenic organisms, such as, *Escherichia coli* (25 mcg./ml.), *Micrococcus pyogenes* (0.5 mcg./ml.) or *Shigella* (25 mcg./ml.).

The starting material in the process of this invention having the above-described Formula II may be obtained by reacting 5-nitro-2-furyl compound having the formula

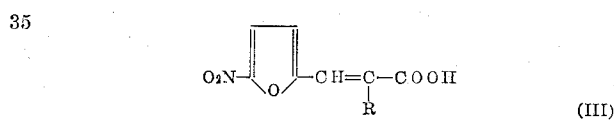

wherein R has the same meanings as above with thionyl chloride or phosphorous pentachloride and then treating the acid chloride thus obtained with hydrazine hydrate in an inert organic solvent.

The examples below illustrate in detail the procedure used in the practice of this invention.

Example 1

Ten g. of 2-amino - 5 - (5-nitrofurylethenyl)-1,3,4-oxadiazole, 25 g. of 37% formalin and 5 cc. of dimethylformamide are mixed and the resulting mixture is heated with stirring at 90–95° C. for 1 hour. Dark-red clear solution is formed. After completion of the reaction, the reaction mixture is filtered while hot and allowed to be cooled to give 8.6 g. of 2-di(hydroxymethyl)amino-5-(5-nitrofurylethenyl)-1,3,4-oxadiazole as orange yellow powdery crystals melting at 142–143° C.

Example 2

To a solution of 2 g. of 2-amino - 5 - (5-nitrofurylethenyl)-1,3,4-thiadiazole in 10 cc. of dimethylformamide is added 37 g. of 37% formalin and the mixture thus obtained is kept at 80° C. for 1 hour. After completion of the reaction, the reaction mixture is allowed to be cooled and then the powdery crystal which precipitates is recovered by filtration to give 1.5 g. of 2-di(hydroxymethyl)amino-5-(5-nitrofurylethenyl)-1,3,4 - thiadiazole melting at 240° C. (with decomposition).

Example 3

To a solution 0.2 g. of 2-amino-5-[1-ethyl-2-(5-nitrofuryl)ethenyl]-1,3,4-thiadiazole in 1.5 cc. of ethyleneglycol monoethylether is added 0.3 g. of 37% formalin and the resulting mixture is kept at 80° C. for 2 hours. After completion of the reaction, the reaction mixture is cooled and the yellow powdery crystal which precipitates is recovered by filtration to give 0.15 g. of 2 - di(hydroxymethyl)amino - 5-[1-ethyl-2-(5-nitrofuryl)ethenyl]-1,3,4-thiadiazole melting at 116–117° C.

Example 4

To a solution of 1 g. of 2-methylamino-5-[1-ethyl-2-(5-nitrofuryl)ethenyl]-1,3,4-thiadiazole dissolved in 4 cc. of dimethylformamide is added 1 g. of 37% formalin, and the resulting mixture is kept at 80° C. for 2 hours. After completion of the reaction, the reaction mixture is cooled, and orange yellow needles which precipitate are recovered by filtration to give 0.8 g. of 2-N-hydroxymethyl-N-methylamino-5-[1-ethyl - 2-(5-nitrofuryl)ethenyl] - 1,3,4-thiadiazole melting at 158° C. (with decomposition).

Example 5

Three-tenth g. of 2-amino-5-[1-methyl-2-(5-nitrofuryl)ethenyl]-1,3,4-oxadiazole and 0.52 g. of 37% formalin are heated to 90–100° C. for 4 hours in 1.5 cc. of dimethylformamide. After completion of the reaction, 1.5 cc. of water is added to the reaction mixture which is then filtered while hot to give 0.21 g. of 2-di(hydroxymethyl)amino - 5-[1-methyl-2-(5-nitrofuryl)ethenyl]-1,3,4-oxadiazole as yellow powders melting at 180–181° C. (with decomposition).

Similarly, 2-di(hydroxymethyl)amino-5-[1-ethyl-2-(5-nitrofuryl)ethenyl]-1,3,4-oxadiazole is given as yellow powders melting at 167° C. (with decomposition).

Example 6

Three-tenth g. of 2-methylamino-5-(5-nitrofurylethenyl)-1,3,4-oxadiazole and 0.31 g. of 37% formalin are heated to 90–100° C. for 4 hours in 2 cc. of dimethylformamide. After completion of the reaction, the reaction mixture is filtered while hot to give 0.17 g. of 2-(N-hydroxymethyl-N-methyl)amino-5 - (5-nitrofurylethenyl)-1,3,4-oxadiazole as brown microneedles melting at 162–164° C. (with decomposition).

Example 7

Two-tenth g. of 2-ethylamino-5-(5-nitrofurylethenyl)-1,3,4-oxadiazole and 0.2 g. of 37% formalin are heated to 90–95° C. for 4 hours in 1 cc. of dimethylformamide. After completion of the reaction, the reaction mixture is filtered while hot, the filtrate is washed with a small amount of dimethylformamide and then water is added until the cloudy solution is formed. The solution thus formed is filtered to give 0.11 g. of 2-(N-hydroxymethyl-N-ethyl)amino-5 - (5-nitrofurylethenyl)-1,3,4-oxadiazole as microneedles melting at 221–222° C. (with decomposition).

Similarly, the following compound is produced: 2-(N-hydroxymethyl-N-n-butyl)amino-5-(5-nitrofurylethenyl)-1,3,4-oxadiazole, yellow crystals melting at 115–116° C. (with decomposition).

Example 8

One-tenth g. of 2-methylamino-5-[1-methyl-2-(5-nitrofuryl)ethenyl]-1,3,4-oxadiazole and 0.1 g. of 37% formalin are heated to 90–95° C. for 25 hours in 1 cc. of dimethylformamide. After completion of the reaction, the reaction mixture is filtered while hot, and addition of a small amount of water gives crystals immediately. The crystals thus formed are recovered by filtration to give 2 - (N - hydroxymethyl-N-methyl)amino-5-[1-methyl-2-(5-nitrofuryl)ethenyl]-1,3,4-oxadiazole as yellow needles melting at 210–213° C. (with decomposition).

The following compounds are produced in the same way as described above:

2 - (N - hydroxymethyl-N-ethyl)amino-5-[1-methyl-2-(5-nitrofuryl)ethenyl]-1,3,4-oxadiazole, brown needles, M.P. 206–207° C. (with decomposition);

2 - (N' - hydroxymethyl-N-n-butyl)amino-5-[1-methyl-2-(5-nitrofuryl)ethenyl]1,3,4-oxadiazole, yellow needles, M.P. 192° C. (with decomposition);

2 - (N - hydroxymethyl-N-n-butyl)amino-[1-ethyl-2-(5-nitrofuryl)ethenyl] - 1,3,4-oxadiazole, yellow brown needles, M.P. 134–135° C. (with decomposition);

2 - (N - hydroxymethyl-N-methyl)amino-5-[1-phenyl-2-(5-nitrofuryl)ethenyl]-1,3,4-oxadiazole, yellow brown needles, M.P. 138–143° C. (with decomposition); and 2 - (N - hydroxymethyl-N-ethyl)amino-5-[N-ethyl-2-(5-nitrofuryl)ethenyl]-1,3,4-oxadiazole, yellow needles, M.P. 188–189° C. (with decomposition).

We claim.

1. A compound having the formula

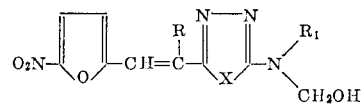

wherein R is a member selected from the group consisting of hydrogen, alkyl of from 1–5 carbon atoms and phenyl; $R_1$ is a member selected from the group consisting of lower alkyl and hydroxymethyl; and X is oxygen or sulfur.

2. 2-di(hydroxymethyl)amino-5-(5-nitrofurylethenyl)-1,3,4-oxadiazole.

3. 2-di(hydroxymethyl)amino-5 - [1-methyl-2-(5-nitrofuryl)ethenyl]-1,3,4-oxadiazole.

4. 2-(N-hydroxymethyl - N - methyl)amino-5-(5-nitrofurylethenyl)-1,3,4-oxadiazole.

5. 2-(N-hydroxymethyl - N - ethyl)amino-5-(5-nitrofurylethenyl)-1,3,4-oxadiazole.

References Cited by the Examiner

UNITED STATES PATENTS 3,146,232   8/1964   Saikachi et al. _____ 260—240

OTHER REFERENCES

Elderfield: Heterocyclic Compounds, vol. 7, page 619 (1961), John Wiley & Sons, N.Y.

Ryohei: Kyoto Diagaku Kagaku Kenkyusho Hokoku, vol. 31, pages 145 and 149–150 (1953).

Saikawa: Yakugaku Zasshi, vol. 84, pages 212 to 219 (March 1964).

Wagner-Zook: Organic Synthetic Methods, page 674 (John Wiley & Sons, N.Y.) (1953).

Wiley: Heterocyclic Compounds, vol. 17, page 272, Interscience Publishers (N.Y.), Dec. 17, 1962.

JOHN D. RANDOLPH, *Primary Examiner.*